(12) United States Patent
Banerjee

(10) Patent No.: US 8,738,420 B1
(45) Date of Patent: May 27, 2014

(54) METHOD AND APPARATUS FOR MODELING SATISFACTION OF A CLIENT

(75) Inventor: Ashok Banerjee, Fremont, CA (US)

(73) Assignee: Google Inc., Mountain View, CA (US)

(*) Notice: Subject to any disclaimer, the term of this patent is extended or adjusted under 35 U.S.C. 154(b) by 196 days.

(21) Appl. No.: 13/272,122

(22) Filed: Oct. 12, 2011

Related U.S. Application Data

(63) Continuation of application No. 12/136,558, filed on Jun. 10, 2008, now abandoned.

(51) Int. Cl.
*G06Q 30/02* (2012.01)
(52) U.S. Cl.
CPC .................................. *G06Q 30/02* (2013.01)
USPC .......................................................... 705/7.29
(58) Field of Classification Search
CPC ....................................................... G06Q 30/02
USPC .......................................................... 705/7.29
See application file for complete search history.

(56) References Cited

U.S. PATENT DOCUMENTS

| | | | | |
|---|---|---|---|---|
| 7,406,436 | B1* | 7/2008 | Reisman | 705/7.32 |
| 7,885,842 | B1* | 2/2011 | Bartolini et al. | 709/226 |
| 2005/0283376 | A1* | 12/2005 | Miyoshi et al. | 705/1 |
| 2008/0103909 | A1* | 5/2008 | Huang et al. | 705/14 |
| 2008/0249752 | A1* | 10/2008 | Keller | 703/2 |
| 2009/0234720 | A1* | 9/2009 | George et al. | 705/11 |

OTHER PUBLICATIONS

Clara Xiaoling Chen, Relevance of Customer Satisfaction Measures in a Setting with Multiple Customer Groups: Evidence from a Health Insurance Company, University of Illinois at Urbana-Champaign Champaign, IL, Jul. 2006, https://aaahq.org/mas/MASPAPERS2007/nonfinancial/Clare%20Chen.pdf.*

* cited by examiner

*Primary Examiner* — Romain Jeanty
*Assistant Examiner* — Kurtin Gills
(74) *Attorney, Agent, or Firm* — Honigman Miller Schwartz and Cohn LLP

(57) ABSTRACT

One embodiment of the present invention provides a system that facilitates modeling satisfaction of a client based on an exponential-decay function. During operation, the system receives an identifier for a client. The system also receives a selection of components to use in modeling the satisfaction of the client. Note that a component is a performance metric, such as a goal, that has a quantifiable result. Next, for each selected component, the system determines a current satisfaction of the client by: determining an initial intensity for the satisfaction based on the component and an initial point in time; determining a decay constant for the client and the component; and using the decay constant in an exponential-decay function to decay the initial intensity to a current point in time, thereby obtaining the current satisfaction. Finally, the system combines the current satisfaction for each selected component to obtain an overall client satisfaction.

15 Claims, 3 Drawing Sheets

METHOD AND APPARATUS FOR MODELING SATISFACTION OF A CLIENT

RELATED APPLICATION

This application is a continuation application of, and hereby claims priority under 35 U.S.C. §120 to, pending U.S. patent application Ser. No. 12/136,558, entitled "Method and Apparatus for Modeling Satisfaction of a Client," with inventor Ashok Banerjee, filing date 10 Jun. 2008.

BACKGROUND

1. Field of the Invention

The present invention relates to a method and an apparatus for modeling satisfaction of a client in a distributed computing system.

2. Related Art

In many strategy selection systems, the ultimate goal is to increase client satisfaction. However, many of these systems fail to accurately model client satisfaction. Particularly, they fail to accurately model the effect of good and bad events on the client over time. Moreover, they also fail to distinguish between the short-term effects and the long-term effects of these events on the client.

For example, many of these systems attempt to model client satisfaction using a goal-based approach. These systems may assign different weights to various goals, and attempt to calculate a weighted average based on the goals. Other systems use priority models wherein a goal with a high priority and a slightly positive value will take precedence over a goal with a lower priority and an overwhelmingly positive value, wherein the latter may actually be preferable.

Hence, what is needed is a method and an apparatus for modeling client satisfaction without the problems listed above.

SUMMARY

One embodiment of the present invention provides a system that facilitates modeling satisfaction of a client based on an exponential-decay function. During operation, the system receives an identifier for a client. The system also receives a selection of components to use in modeling the satisfaction of the client. Note that a component is a performance metric, such as a goal, that has a quantifiable result. Next, for each selected component, the system determines a current satisfaction of the client by: determining an initial intensity for the satisfaction based on the component and an initial point in time; determining a decay constant for the client and the component; and using the decay constant in an exponential-decay function to decay the initial intensity to a current point in time, thereby obtaining the current satisfaction. Finally, the system combines the current satisfaction for each selected component to obtain an overall client satisfaction.

In some embodiments of the present invention, the system determines the current satisfaction for a component by searching a history for a previous event affecting the client. Next, the system determines an instant intensity for the satisfaction of the client at the time of the previous event based on the component. Finally, the system applies the exponential-decay function to decay the instant intensity to a current point in time to obtain the current satisfaction for the component.

In some embodiments of the present invention, the system replaces the initial intensity with the instant intensity. The system also replaces the initial point in time with the time of the previous event.

In some embodiments of the present invention, the system applies a modifier to a current satisfaction for a given component.

In some embodiments of the present invention, the system applies the modifier for a specified period of time.

In some embodiments of the present invention, the system adjusts the initial intensity for a specified period of time.

In some embodiments of the present invention, the system adjusts the decay constant for a specified period of time.

In some embodiments of the present invention, the system uses the overall client satisfaction and the current satisfaction for selected components as inputs in a priority routing system.

In some embodiments of the present invention, the priority routing system is a network load balancer.

In some embodiments of the present invention, the system uses the overall client satisfaction and the current satisfaction for selected components as inputs in a decision-making system.

In some embodiments of the present invention, a component in the selection of components can include any performance metric, such as: a latency of a response to a request, an accuracy of the response, a completeness of the response, and a timeliness of the response.

DETAILED DESCRIPTION

Figure 1:
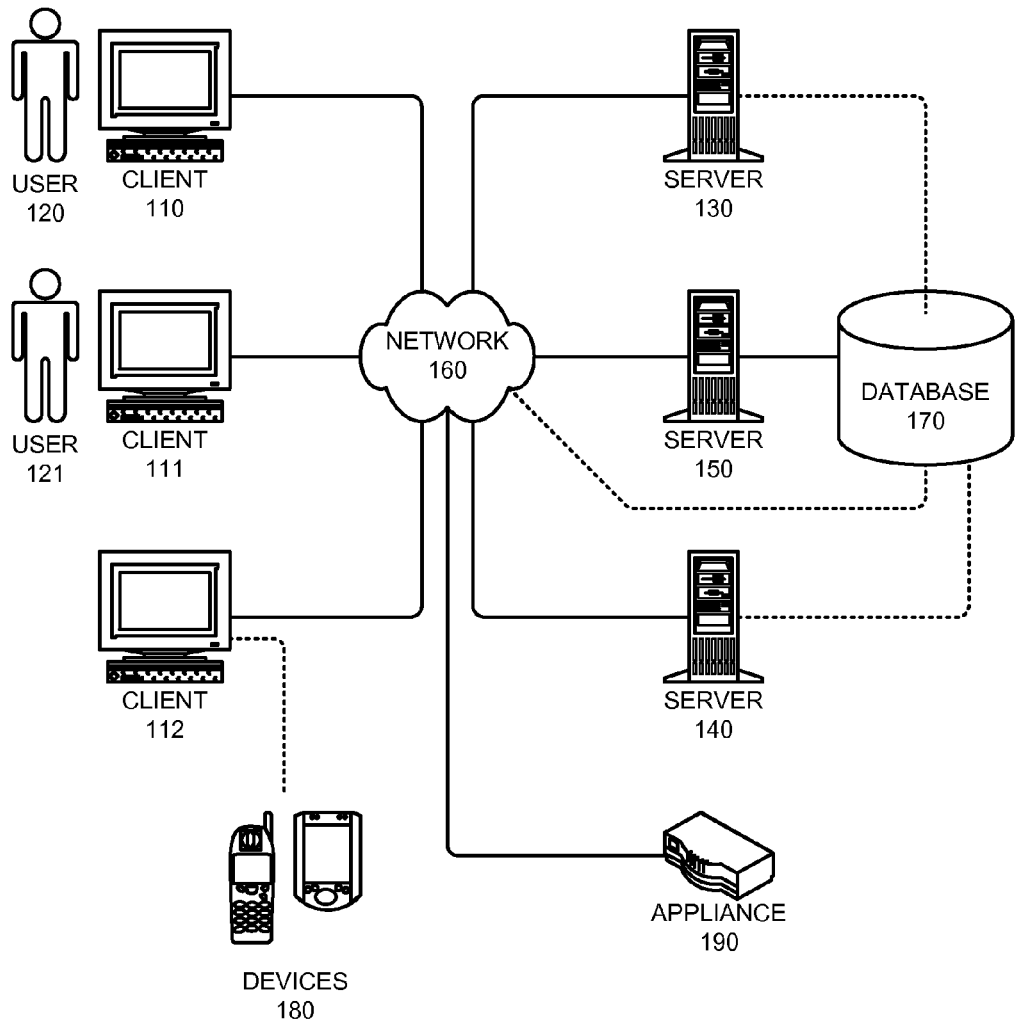
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

OVERVIEW

One embodiment of the present invention provides a system that facilitates modeling satisfaction of a client based on an exponential-decay function. During operation, the system receives an identifier for a client. The system also receives a selection of components to use in modeling the satisfaction of the client. Next, for each selected component, the system determines a current satisfaction of the client by: determining an initial intensity for the satisfaction based on the component and an initial point in time; determining a decay constant for the client and the component; and using the decay constant in an exponential-decay function to decay the initial intensity to a current point in time, thereby obtaining the current satisfaction. Finally, the system combines the current satisfaction for each selected component to obtain an overall client satisfaction.

For example, given a component C with a decay constant k, the initial intensity of satisfaction (the intensity when time $t=0$) can be represented as $C_0$. Satisfaction for a component can then be represented as $C(t)=C_0 e^{-kt}$.

For different components, the initial intensity of satisfaction $C_0$, and the decay constant k, will vary. Components that contribute to satisfaction with a very sharp immediate effect and a short duration of the effect will have high values for $C_0$, as well as very high values for k. In contrast, components that contribute with a very small immediate effect, but a long duration of the effect will have low values for $C_0$, as well as very low values for k.

The overall client satisfaction can then be calculated by simply summing the total of all component satisfaction (or dissatisfaction) for all events. Thus, the equation for overall client satisfaction can be represented as: $C_0 e^{-k0t} + C_1 e^{-k1t} + \ldots + C_n e^{-knt}$.

In some embodiments of the present invention, the system determines the current satisfaction for a component by searching a history for a previous event affecting the client. Next, the system determines an instant intensity for the satisfaction of the client at the time of the previous event based on the component. Finally, the system applies the exponential-decay function to decay the instant intensity to a current point in time to obtain the current satisfaction for the component.

Because any given event may have an effect on the satisfaction for a given component, the system factors in the effects of events on the component satisfaction.

In some embodiments of the present invention, the system replaces the initial intensity with the instant intensity. The system also replaces the initial point in time with the time of the previous event.

For example, at any given point in time where the system calculates a current component satisfaction, the system may then use the current component satisfaction as a benchmark for future calculations of component satisfaction. The system accomplishes this by considering the current component satisfaction as the initial intensity of satisfaction for the component, and considering the current point in time as the initial point in time, when performing future calculations.

In some embodiments of the present invention, the system applies a modifier to a current satisfaction for a given component.

In many instances, the system may want to assign particular importance to a component based on some other criteria. For example, for a short period of time, such as the end of a fiscal quarter, the system may wish to add a modifier to the timeliness component because the client may have a more intense satisfaction response to a timeliness event during this time period.

In some embodiments of the present invention, the system applies the modifier for a specified period of time. For example, the system may have a set of modifiers that it applies to a client for a specified period of time leading up to a holiday. During this specified period of time, the client's satisfaction response to events may be different than during normal operating times.

In some embodiments of the present invention, the system adjusts the initial intensity for a specified period of time. Another way of increasing the effect of a particular component is to temporarily increase the initial intensity of satisfaction for the particular component.

In some embodiments of the present invention, the system adjusts the decay constant for a specified period of time. By adjusting the decay constant for a particular component, the system can temporarily adjust the duration for which a particular event affects the overall satisfaction of the client.

In some embodiments of the present invention, the system uses the overall client satisfaction and the current satisfaction for selected components as inputs in a priority routing system. For example, the system may route requests from clients that currently have a very high total dissatisfaction over clients that have a higher total satisfaction.

In some embodiments of the present invention, the priority routing system is a network load balancer. Note that load balancing can be based on total satisfaction, or on individual components of satisfaction. Embodiments of the present invention allow the system to determine the effects of various events on each individual client, and can route traffic accordingly.

In some embodiments of the present invention, the system uses the overall client satisfaction and the current satisfaction for selected components as inputs in a decision-making system.

In some embodiments of the present invention, a component in the selected components can include any performance metric, such as: a latency of a response to a request, an accuracy of the response, a completeness of the response, and a timeliness of the response.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different configurations, and are not limited to the configuration illustrated in computing environment 100. In some embodiments of the present invention, appliance 190 models the satisfaction of clients 110-112, and uses the satisfaction model to route traffic from clients 110-112 to servers 130-150. In another embodiment of the present invention, server 150 uses a satisfaction model to prioritize the execution of requests from clients 110-112. Note that modeling the satisfaction of clients 110-112 refers to modeling the satisfaction of organizations or users that are using clients 110-112, such as users 120 and 121, and not modeling the satisfaction of the physical hardware embodying clients 110-112.

Figure 2:
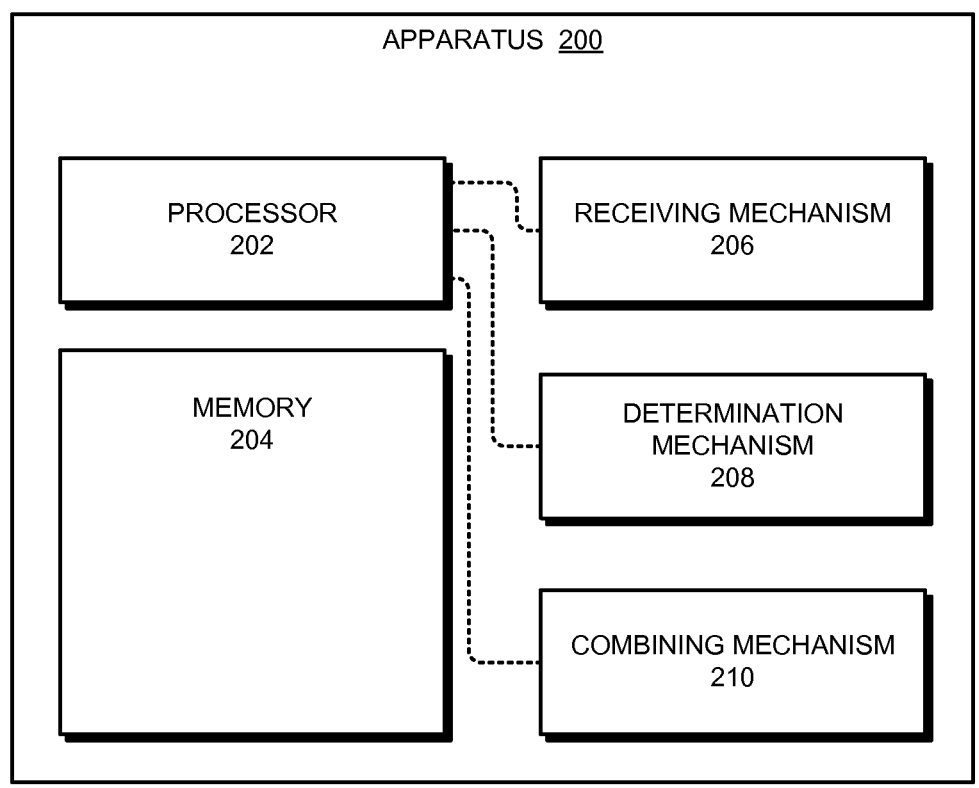
FIG. 2 illustrates an apparatus in accordance with an embodiment of the present invention.

FIG. 2 illustrates apparatus 200 in accordance with an embodiment of the present invention. Apparatus 200 comprises processor 202, memory 204, receiving mechanism 206, determination mechanism 208, and combining mechanism 210. Note that receiving mechanism 206, determination mechanism 208, and combining mechanism 210 can be embodied in hardware in apparatus 200, or can be embodied in software loaded in memory 204 and executed on processor 202. In some embodiments of the present invention, apparatus 200 is an appliance, such as appliance 190. In other embodiments of the present invention, apparatus 200 is a server, such as server 150.

Receiving mechanism 206 is configured to receive an identifier for a client, as well as to receive a selection of components to use in modeling the satisfaction of the client. Determination mechanism 208 is configured to determine a current satisfaction of the client for each selected component by: determining an initial intensity for the satisfaction based on the component and an initial point in time; determining a decay constant for the client and the component; and using the decay constant in an exponential-decay function to decay the initial intensity to a current point in time, thereby obtaining the current satisfaction. Combining mechanism 210 is configured to combine the current satisfaction for each selected component to obtain an overall client satisfaction.

Modeling Satisfaction of a Client

Figure 3:
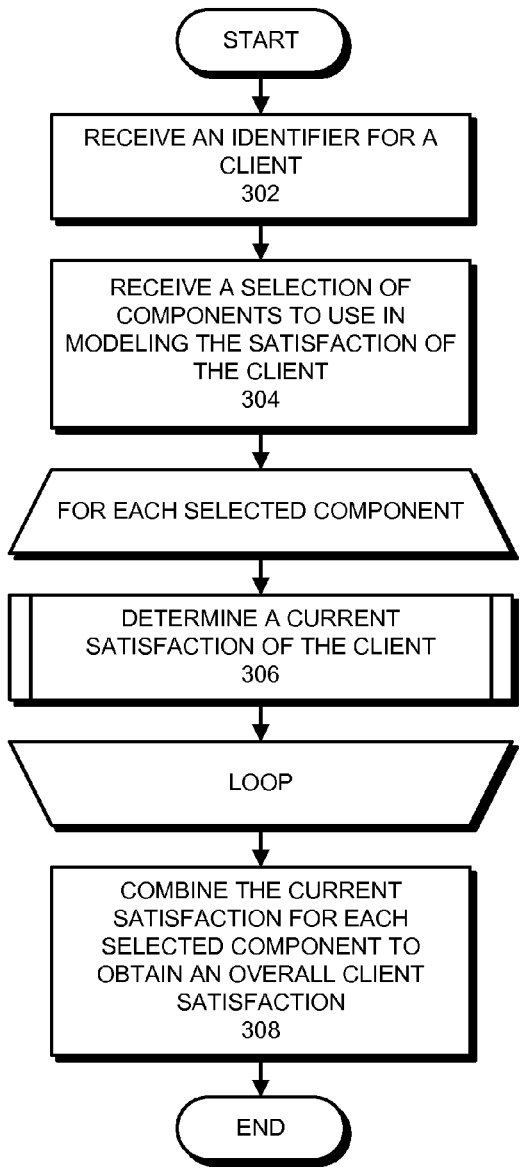
FIG. 3 presents a flow chart illustrating the process of modeling satisfaction of a client in accordance with an embodiment of the present invention.

FIG. 3 presents a flow chart illustrating the process of modeling satisfaction of a client in accordance with an embodiment of the present invention. During operation, the system receives an identifier for a client (operation 302). The system also receives a selection of components to use in modeling the satisfaction of the client (operation 304). Next, for each selected component, the system determines a current satisfaction of the client (operation 306). Note that determining a current satisfaction of a client is explained in more detail in the description of FIG. 4, below. Finally, the system combines the current satisfaction for each selected component to obtain an overall client satisfaction (operation 308).

Determining a Component Satisfaction of a Client

Figure 4:
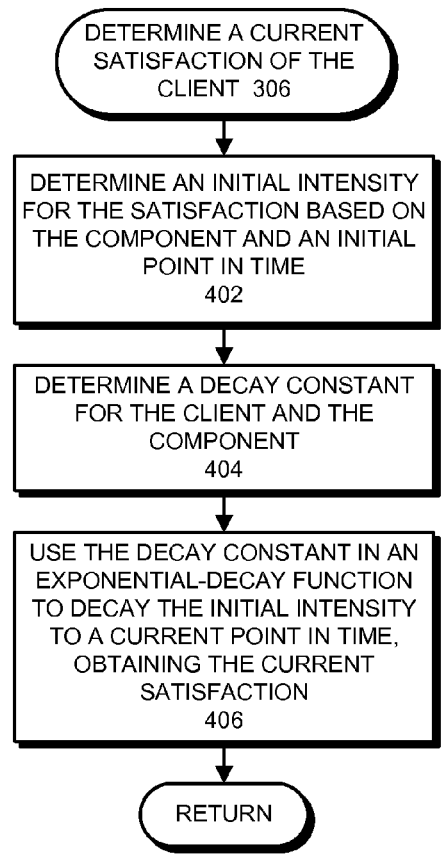
FIG. 4 presents a flow chart illustrating the process of determining a component satisfaction of a client in accordance with an embodiment of the present invention.

FIG. 4 presents a flow chart illustrating the process of determining a component satisfaction of a client in accordance with an embodiment of the present invention. During operation, the system determines an initial intensity for the satisfaction based on the component and an initial point in time (operation 402).

Next, the system determines a decay constant for the client and the component (operation 404). Note that each component for each client has its own initial satisfaction intensity and decay constant. The decay constant and the initial satisfaction intensity may vary from component to component, and from client to client.

Finally, the system uses the decay constant in an exponential-decay function to decay the initial intensity to a current point in time, thereby obtaining the current satisfaction (operation 406).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for modeling a satisfaction of a client, the method executed by a processor and comprising:
   receiving, at the processor, a client identifier;
   receiving, at the processor, a selection of performance metrics to use in modeling the satisfaction of the client;
   for a first selected performance metric, applying an exponential decay function on the first selected performance metric to determine a current satisfaction of the client, wherein applying the exponential decay function on the first selected performance metric comprises:

determining, by the processor, an initial intensity of a satisfaction for the first selected performance metric and an initial point in time, determining, by the processor, a first decay constant for the client and the first selected performance metric, and using the first decay constant in the exponential decay function to decay the initial intensity to a current point in time, thereby obtaining the current satisfaction of the client for the first selected performance metric;

for a second selected performance metric, applying the exponential decay function on the second selected performance metric to determine the current satisfaction of the client, wherein applying the exponential decay function on the second selected performance metric comprises:

determining, by the processor, an initial intensity of a satisfaction for the second selected performance metric and an initial point in time corresponding to the initial intensity of the satisfaction for the second selected component, searching, by the processor, a history for a previous event affecting the client, determining, by the processor, a time of the previous event and an instant intensity of the satisfaction of the client for the second selected performance metric at the time of the previous event, determining, by the processor, a second decay constant for the client and the second selected performance metric, replacing, by the processor, the initial intensity of the satisfaction with the instant intensity of the satisfaction and the initial time with the time of the previous event in the exponential decay function, and using the second decay constant in the exponential decay function to decay the instant intensity to a current point in time to obtain the current satisfaction of the client for the second selected performance metric;

factoring in, by the processor, an effect of an event on the current satisfaction for the first selected performance metric and the second selected performance metric by:

changing a contribution of the first selected performance metric and the second selected performance metric to the satisfaction of the client by applying a modifier to at least one of the current satisfaction for the first selected performance metric and the second selected performance metric, wherein the modifier is applied for a predetermined period of time associated with the event; and combining, by the processor, the current satisfaction for the first selected performance metric and the second selected performance metric to obtain an overall client satisfaction.

2. The method of claim 1, further comprising adjusting the initial intensity for the predetermined period of time.

3. The method of claim 1, further comprising adjusting the first decay constant for the predetermined period of time.

4. The method of claim 1, further comprising using, by the processor, the overall client satisfaction and the current satisfaction for the selected performance metrics as inputs in a priority routing system.

5. The method of claim 4, wherein the priority routing system is a network load balancer.

6. The method of claim 1, further comprising using, by the processor, the overall client satisfaction and the current satisfaction for the first selected performance metric and the second selected performance metric as inputs in a decision-making system.

7. The method of claim 1, wherein at least one of the first selected performance metric and the second selected performance metric includes at least one of:
a latency of a response to a request;
an accuracy of the response;
a completeness of the response; and
a timeliness of the response.

8. A non-transitory computer-readable storage device storing instructions that when executed by a computer cause the computer to perform a method for modeling satisfaction of a client, the method comprising:

receiving, at a processor, an identifier for a client;

receiving, at the processor, a selection of performance metrics to use in modeling the satisfaction of the client;

for a first selected performance metric, applying an exponential decay function on the first selected performance metric to determine a current satisfaction of the client, wherein applying the exponential decay function on the first selected performance metric comprises:

determining, by the processor, an initial intensity of a satisfaction for the first selected performance metric and an initial point in time, determining, by the processor, a first decay constant for the first selected component performance metric associated with the client, and using the first decay constant in the exponential decay function to decay the initial intensity to a current point in time, thereby obtaining the current satisfaction of the client for the first selected component performance metric;

for a second selected performance metric, determining the current satisfaction of the client by:

searching, by the processor, a history for a previous event affecting the client, determining, by the processor, a time of the previous event and an instant intensity of the satisfaction of the client for the second selected performance metric at the time of the previous event, determining, by the processor, a second decay constant for the second selected performance metric associated with the client, and using the second decay constant in the exponential decay function to decay the instant intensity to a current point in time to obtain the current satisfaction of the client for the second selected performance metric;

factoring in, by the processor, an effect of an event on the current satisfaction for the first selected performance metric and the second selected performance metric by:

changing a contribution of the first selected performance metric and the second selected performance metric to the satisfaction of the client by applying a modifier to at least one of the current satisfaction for the first selected component performance metric and the second selected performance metric, wherein the modifier is applied for a specified period of time associated with the event; and combining, by the processor, the current satisfaction for the first selected performance metric and the second selected performance metric to obtain an overall client satisfaction.

9. The computer-readable storage device of claim 8, wherein the method further comprises adjusting the initial intensity for the specified period of time.

10. The computer-readable storage device of claim 8, wherein the method further comprises adjusting the first decay constant for the specified period of time.

11. The computer-readable storage device of claim 8, wherein the method further comprises using the overall client satisfaction and the current satisfaction for the first selected performance metric and the second selected performance metric as inputs in a priority routing system.

12. The computer-readable storage device of claim 11, wherein the priority routing system is a network load balancer.

13. The computer-readable storage device of claim 8, wherein the method further comprises using the overall client satisfaction and the current satisfaction for the selected performance metrics as inputs in a decision-making system.

14. The computer-readable storage device of claim 8, wherein at least one of the first selected performance metric and the second selected performance metric includes at least one of:
- a latency of a response to a request;
- an accuracy of the response;
- a completeness of the response; and
- a timeliness of the response.

15. An apparatus configured to model a satisfaction of a client comprising:
- a processor;
- a memory;
- a receiving mechanism configured to receive a client identifier and a selection of performance metrics to use in modeling the satisfaction of the client;
- a determination mechanism configured to apply an exponential decay function on each selected performance metric to determine a current satisfaction of the client, wherein applying the exponential decay function on each selected performance metric comprises:
    - determining an initial intensity for a satisfaction for each selected performance metric and an initial point in time,
    - determining a decay constant for the client and the each selected performance metric,
    - searching a history for a previous event affecting the client,
    - determining a time of the previous event and an instant intensity of the satisfaction of the client for each selected performance metric at the time of the previous event,
    - replacing, by the processor, the initial intensity of satisfaction with the instant intensity of satisfaction and the initial time with the time of the previous event,
    - using the decay constant in the exponential-decay function to decay the instant intensity to a current point in time, thereby obtaining the current satisfaction of the client for the each selected performance metric,
    - factoring in an effect of an event on the current satisfaction for each selected performance metric by:
        - changing the contribution of the one or more selected performance metrics to the satisfaction of the client by applying a modifier to the current satisfaction for the one or more selected performance metrics, wherein the modifier is applied for a predetermined period of time associated with the event; and
- a combining mechanism configured to combine the current satisfaction for each selected performance metric to obtain an overall client satisfaction.

\* \* \* \* \*

UNITED STATES PATENT AND TRADEMARK OFFICE
CERTIFICATE OF CORRECTION

PATENT NO.        : 8,738,420 B1
APPLICATION NO.   : 13/272122
DATED             : May 27, 2014
INVENTOR(S)       : Ashok Banerjee It is certified that error appears in the above-identified patent and that said Letters Patent is hereby corrected as shown below:

IN THE CLAIMS:

At column 8, claim number 8, line number 28, delete "component".

At column 8, claim number 8, line number 33, delete "component".

At column 8, claim number 8, line number 57, delete "component".

Signed and Sealed this
Second Day of December, 2014

Michelle K. Lee
*Deputy Director of the United States Patent and Trademark Office*